Patented May 28, 1935

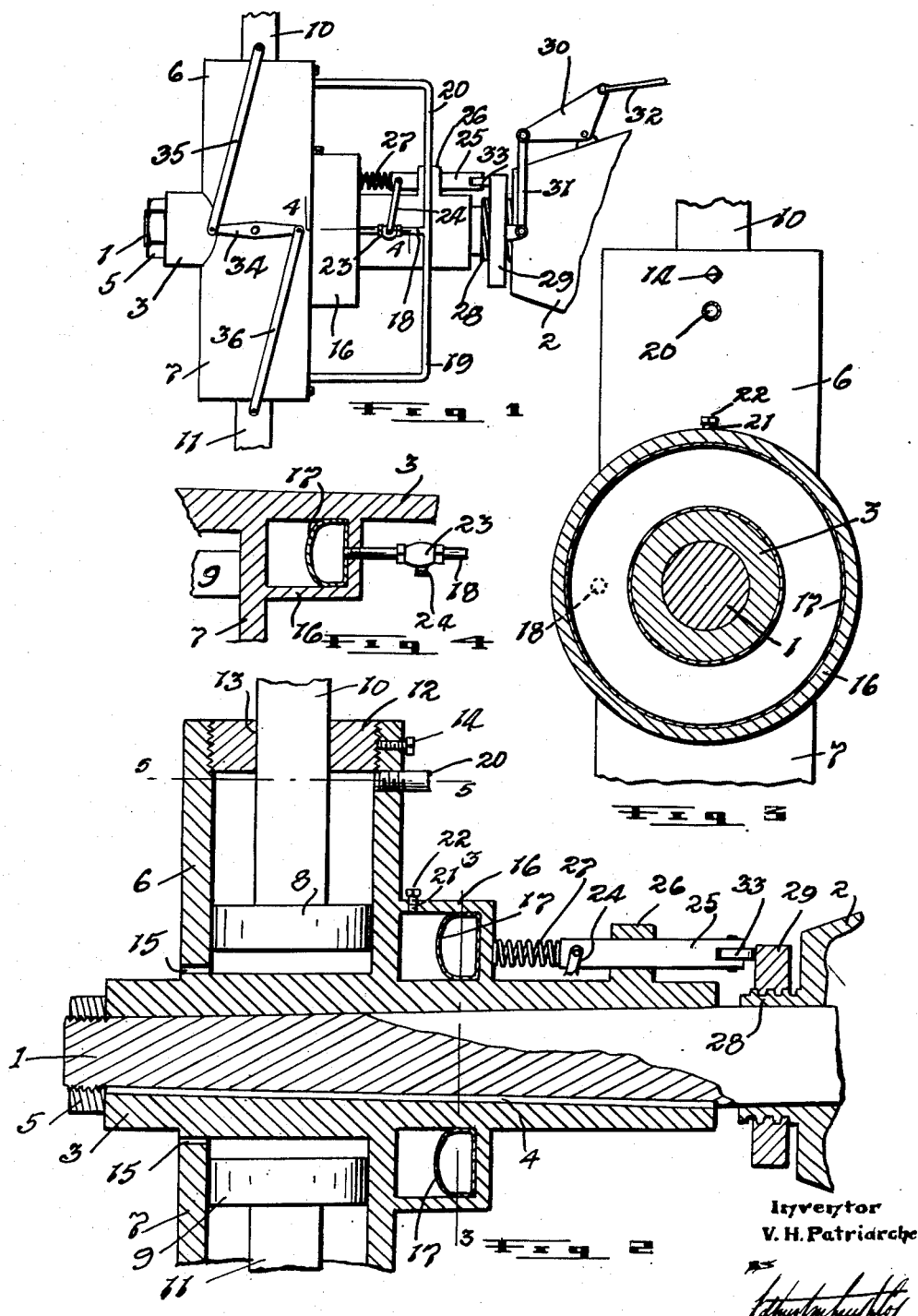

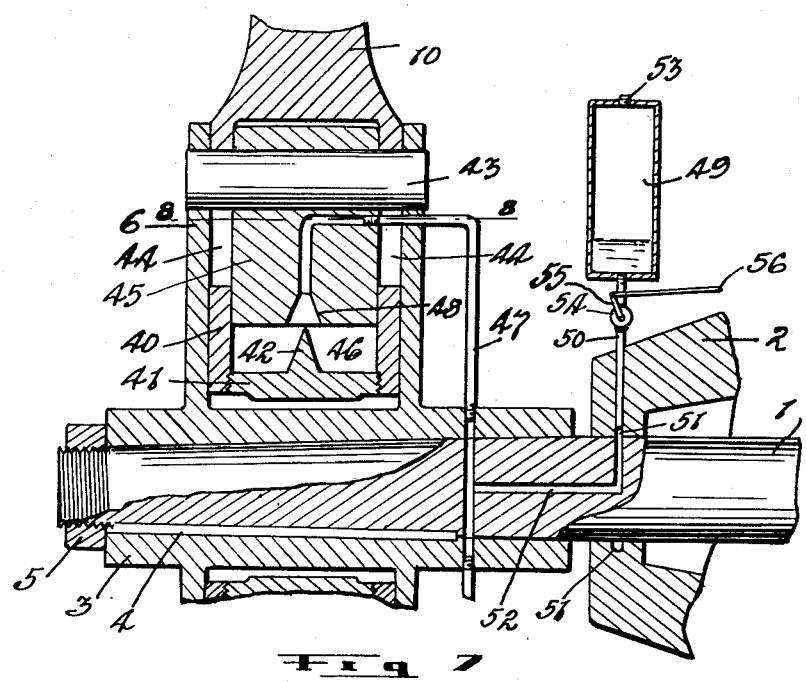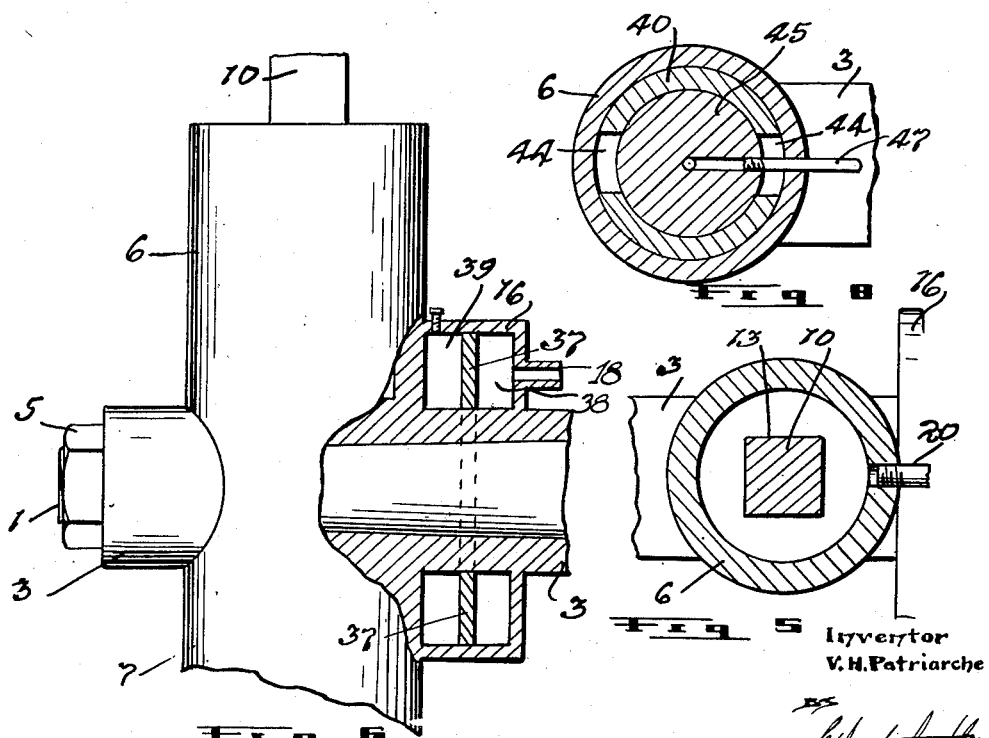

2,002,712

UNITED STATES PATENT OFFICE 2,002,712

VARIABLE DIAMETER PROPELLER

Valance H. Patriarche, Winnipeg, Manitoba, Canada

Application September 12, 1933, Serial No. 689,152

10 Claims. (Cl. 170—163)

The invention relates to improvements in variable diameter propellers particularly designed for use on aircraft and an object of the invention is to provide a propeller having the blades thereof slidably mounted so that they can be simultaneously shifted radially to increase or diminish the diameter of the propeller and without altering the pitch angle of the blades, such permitting of high engine revolutions with a propeller of minimum diameter as is suitable for taking off and climbing conditions and allowing of maximum propeller diameter for cruising or high speed conditions of flight.

A further object of the invention is to associate a fluid with each propeller blade which is adapted to be expelled by the outward radial movement of the blades under centrifugal force and acts to compress a further fluid which latter fluid is utilized to return the blades inwardly to their original position upon the centrifugal force acting on the blades being diminished.

A further object of the invention is to provide means under the control of the pilot for controlling the flow of the fluid and further to provide means for automatically gradually cutting off the flow of the fluid to gradually bring the out moving blades to rest, thereby avoiding shock stresses.

A further object is to provide a link mechanism connecting the blades which will insure an equal radial movement in each blade while the mechanism itself remains free from the heavy radial thrust loads acting on the blades.

A further object is the provision of a fluid to carry the radial thrust load acting on the blade.

With the above more important and other minor objects in view which will become more apparent as the description proceeds, the invention consists essentially in the arrangement and construction of parts hereinafter more particularly described, reference being had to the accompanying drawings, in which:—

Fig. 1 is a side view of the invention.

Fig. 2 is an enlarged detailed vertical sectional view longitudinally through the device, certain parts being shown in side elevation.

Fig. 3 is a vertical cross sectional view at 3—3 Figure 2.

Fig. 4 is an enlarged detailed horizontal cross sectional view at 4—4, Figure 1.

Fig. 5 is a cross sectional view at 5—5 Figure 2.

Fig. 6 is an enlarged detailed view partly in section showing a modified construction of the fluid chamber.

Fig. 7 is a sectional view showing a further modification of my invention.

Fig. 8 is a cross sectional view at 8—8 Figure 7.

In the drawings like characters of reference indicate corresponding parts in the several figures.

The propeller shaft 1 is of the usual type and extends in the usual manner in advance of the nose 2 of the airplane. On the propeller shaft, I mount the hub 3 of the propeller which is designed to rotate with the shaft and is herein shown as held by a key 4 and an applied nut 5.

The hub is supplied at diametrically opposite sides with radially disposed cylinders 6 and 7 which receive slidable plungers or pistons 8 and 9 located at the inner ends or roots of propeller blades 10 and 11. The outer ends of the cylinders are closed by screw plugs 12 through which the inner ends of the blades slidably pass and to prevent any rotary movement of the blades around their longitudinal axis, I have shown the plugs as fitted with square holes 13 receiving slidably the squared ends of the blades. The plugs are prevented from rotating by jam screws 14.

Obviously any other means could be used for preventing rotary movement of the blades around their longitudinal axes and in this connection, I might mention that it is necessary that the blades be able to move radially outwardly without altering the pitch angle of the blade.

A small hole 15 is located adjacent the inner end of each cylinder to avoid any tendency to vacuum at the inner sides of the pistons.

An annular fluid chamber 16 is also associated with the hub and this chamber contains a further expansible and contractible fluid chamber 17 which is connected by a pipe 18 to branch pipes 19 and 20 leading to the outer ends of the cylinders. A valve nipple 21 opens to the chamber 16 and is provided with a suitable removable cap 22. A fluid such as air is pumped into the chamber 16 to a desired pressure through the nipple and is maintained therein and obviously operates against the expansible and contractible chamber 17. A fluid such as oil is placed in the outer ends of the cylinders and is adapted to be discharged from the cylinders by the outwardly moving pistons and passed to the chamber 17 which will be expanded thereby within the chamber 16 and will accordingly bring the air within the latter chamber under considerable pressure.

It is to be here understood that when the shaft is rotating, the blades will have a natural tendency to out shift under the action of centrifugal force and this out shifting movement of the blades is utilized to displace the oil from the cylinders into the chamber 17 and increase the pressure of the air in the surrounding chamber 16. Conversely, upon the centrifugal force acting on the blades being diminished, the air under pressure within the chamber 16 is designed to force the oil back into the cylinders and cause the blades to resume their original position.

A valve under the control of the pilot is supplied to control the flow of oil from the cylinders to the chamber 16. The valve, indicated at 23, is located in the pipe 18 and is provided with a lever 24 pivotally connected to the inner end of a bar 25 extending longitudinally of the hub and slidably carried in a bearing 26 supplied thereon. The bar is normally forced rearwardly by the action of a spring 27 and in the rear position of the bar, the valve is closed.

The nose of the airplane is supplied with an exteriorly screw threaded stationary sleeve 28 on which I mount a screw threaded ring 29. A rocking lever 30 is pivotally mounted on the nose of the machine and is connected by a link 31 to the ring, suitable ball and socket joints being used to permit of the turning of the ring under the influence of the lever 30. An operating rod 32 passes from the lever to within convenient range of the pilot and the arrangement is such that upon the pilot pulling the rod 32 rearwardly, he will rotate the ring in a clockwise direction on the sleeve 19 and so advance it to end shift the bar 25 sufficiently far to open the valve. A roller 33 is mounted on the rear end of the bar and rides the face of the ring.

I of course do not wish to be limited to the detailed arrangement just described for controlling the valve as any suitable mechanical construction which will serve my purpose in this regard will suffice.

In order to insure an equal radial movement of each blade, I have provided a link mechanism connecting the blades which embodies a rocker arm 34 pivotally carried by the hub, and links 35 and 36 pivotally connected to the ends of the rocker arm and pivotally attached to the blades. The arrangement shown is located at both sides of the hub.

The blades are initially set at the inner end of their travel and as long as the valve 23 is kept closed, will remain in such position as the oil cannot escape from the cylinders. In this position, the propeller has a minimum diameter and this permits high engine revolutions at low forward speed suitable for taking off and climbing conditions. When the pilot, however, desires to increase the diameter of the propeller as for cruising or high speed condition of flight, the valve is opened and the blades move outwardly under the action of centrifugal force and the oil is passed from the cylinders into the chamber 17 where it compresses the air in the surrounding chamber 16.

When it is desired to diminish the diameter of the propeller, the engine is throttled to such a speed that the air in the chamber 17 upon the valve being opened, is free to force the fluid back into the cylinders and so return the blades to their original positions. I might here point out that as the pistons are approaching their outer point of travel, they gradually cut off the outlet passage of the oil from the cylinders so that the moving blades are gradually brought to rest, thereby avoiding shock stresses.

In Figure 6, I have shown a slight modification of the invention. In this modification, the chamber 16 is divided into two compartments by an annular disc 37 and the disc is free to shift bodily to the right or to the left under the existing pressure in the chambers 38 and 39 so provided. In this modification, the oil pipe 18 connects with the chamber 38 and the chamber 39 contains the air and obviously upon the oil flowing into the chamber 38, the air in the chamber 39 will be compressed and subsequently the compressed air in the chamber 39 can be used to expel the oil back into the cylinders in the same manner as previously described.

In Figures 7 and 8, I have shown a still further modification of the invention both in the hub arrangement and in the chamber arrangement. In this construction, the inner ends of the blades terminate in cylindrical extensions 40 slidably received within the hub cylinders and have their lower ends permanently closed by a screw plug 41 which is provided with a conical valve 42. The hub cylinders each carry a stationary cross pin 43 and the cylindrical extension 40 is provided with longitudinal slots 44 to receive the pin. A plunger or piston 45 is carried by the pin and is slidably received within the cylindrical extension 40 and obviously the plunger, cylindrical extension and plug 41 provide a chamber 46 which can be used for the reception of a fluid such as oil and the arrangement is such that when the blades move outwardly under the action of centrifugal force the oil will be expelled through a pipe 47 leading from such chamber.

It will be observed that the inner end of the plunger 45 is supplied at the entrance end of the pipe 47 with a cone shaped valve seat 48 which is adapted as the valve 42 closes to gradually cut off the flow of oil and this operates to avoid shock as the blades are approaching their outermost positions.

The tank or container 49 for the fluid in this last modification is mounted on the nose 2 of the airplane and has a pipe 50 leading downwardly from the bottom thereof and communicating with a duct 51 surrounding the propeller shaft. A duct 52 is provided in the propeller shaft, one end of which communicates continuously with the duct 51 and the other end of which communicates with the pipes 47 leading to the chambers 46. The tank 49 is supplied with a valve nipple 53 so that the air can be placed initially under pressure in the tank. A control valve 54 is inserted in the pipe 50 and is supplied with a suitable crank 55 which is attached to a control rod 56 passing within convenient range of the aviator.

In the modified construction just described, the tank 49 is stationarily mounted on the airplane and the oil expelled from the chambers 46 is discharged into the tank through the connections shown and compresses the air in the tank assuming the valve 54 is opened and such oil when desired, will be forced back into the chambers 46 by the pressure of the air in the tank, the whole device acting in the same manner as in the structures previously described.

While I have mentioned oil and air as the fluids, it will of course be understood that I do not desire to be limited to such particular fluids as any fluids which will serve my purpose will suffice.

In the type of construction shown wherein all parts, with the exception of the valve control mechanism, rotate with the hub, it is most desirable to separate the oil from the air for the reason that if they were not separated, the action of centrifugal force on the oil in the rotation of the hub would keep the oil at the outer wall of the container and would allow it to collect at the lowest point when the hub ceased rotating and this would permit air flowing back into the oil pipes.

In the type of construction shown where the container for the oil and air is mounted on the nose or such non-rotating part of the airplane, it is not necessary to keep the oil separated from the air as in such mounting, there is no difficulty experienced through the action of centrifugal force. The only trouble which might be found in the latter arrangement would be in preventing leakage of oil in the line.

I might point out that the air is maintained in all cases at an initial pressure and requires to exert sufficient pressure in all cases to force the blades back to their innermost positions upon the engine being throttled.

What I claim as my invention is:—

1. In combination with a propeller having the blades thereof mounted for out movement in a radial direction under the action of centrifugal force a container having a fluid therein displaced by the blades as they move outwardly and a second fluid compressed by the displaced former fluid.

2. In combination with a propeller having the blades thereof mounted for out movement in a radial direction under the action of centrifugal force, a container having a compressible fluid therein and a non-compressible fluid adapted to be displaced by the out moving blades and acting upon the former fluid to compress the same.

3. In combination with a propeller having the blades thereof mounted for out movement in a radial direction under the action of centrifugal force a cylinder at the root of each blade containing a non-compressible fluid and arranged such that the fluid is expelled from the cylinders in the out movement of the blades, a chamber connected through a suitable line with the former cylinders and receiving the expelled fluid, a compressible fluid in the latter chamber and a control valve in the line.

4. In combination, a rotary hub having radially disposed cylinders, propeller blades having their inner ends mounted for radial sliding movement within the cylinders and forming therewith chambers adapted to receive a non-compressible fluid dischargable from the chambers in the out movement of the blades, a chamber containing a compressible fluid, said chamber receiving the fluid discharged from the former chambers and a valve for controlling the passage of fluid between the first mentioned chambers and the latter chamber.

5. In combination with a propeller having the blades thereof mounted for out movement in a radial direction from the hub, cylinders extending radially upon said hub, plungers at the roots of said blades sliding within said cylinders under centrifugal force, a non-compressible fluid contained in each cylinder and adapted to be discharged from the cylinder in the out movement of the blade, a chamber containing a compressible fluid and connected with the former chambers and a valve for controlling the flow through the connection.

6. In combination, a rotating hub having radially disposed cylinders and a chamber rotating therewith and containing a compressible fluid, propeller blades having their inner ends provided with plungers operating within the cylinders and forming therewith chambers containing a non-compressible fluid adapted to be expelled from the chambers by an out movement of the blades under the action of centrifugal force, a line connecting the latter chambers with the former chamber, a control valve introduced in the line and means for operating the valve from a remote point.

7. The combination with a rotary hub having radially extending cylinders, propeller blades having their inner ends provided with plungers slidably mounted for in and out radial movement within the cylinders and forming with the cylinders chambers containing a non-compressible fluid adapted to be discharged from the cylinders by an out movement of the blades under the action of centrifugal force, a closed chamber rotating with the hub and containing a compressible fluid, connections for directing the expelled non-compressible fluid from the former chamber to the latter chamber, means separating the fluids in the latter chamber but permitting of the compression of the compressible fluid by the entering non-compressible fluid and a control valve for controlling the flow of fluid through the connections.

8. A propeller having the blades thereof mounted for out movement in a radial direction under the action of centrifugal force, a fluid displaced by the blades as they move outwardly, a second fluid compressed by the displaced former fluid and a valve for controlling the flow of the first mentioned fluid.

9. A propeller having the blades thereof mounted for out movement in a radial direction under the action of centrifugal force, interconnections between the blades insuring of their simultaneous out movement, a fluid displaced by the blades as they move outwardly, a second fluid compressed by the displaced former fluid and a valve for controlling the flow of the first mentioned fluid.

10. A propeller having the blades thereof mounted for out movement in a radial direction under the action of centrifugal force and provided at the root of each blade with a chamber containing a fluid and arranged such that the fluid is expelled from the chamber in the out movements of the blades, a closed chamber connected through a suitable line with the former chambers and receiving the expelled fluid and a control valve in the line.

VALANCE H. PATRIARCHE.